United States Patent [19]

Kise et al.

[11] 3,773,679

[45] Nov. 20, 1973

[54] SODIUM DITHIONITE SOLUTION STABILIZATION

[75] Inventors: Mearl A. Kise, Portsmouth; Leonard C. Ellis, Chesapeake, both of Va.

[73] Assignee: Virginia Chemicals Inc., Portsmouth, Va.

[22] Filed: Jan. 14, 1972

[21] Appl. No.: 218,011

Related U.S. Application Data

[63] Continuation-in-part of Ser. No. 3,527, Jan. 16, 1970, abandoned.

[52] U.S. Cl..................... 252/188, 252/105, 8/110, 423/515
[51] Int. Cl............................................ C01b 17/66
[58] Field of Search ................ 252/188, 105; 8/110; 423/515

[56] References Cited
UNITED STATES PATENTS

| 3,183,191 | 5/1965 | Hach.................................. 252/188 |
| 1,736,464 | 11/1929 | Rodman et al. ..................... 252/188 |
| 2,995,522 | 8/1961 | Joyce.................................. 423/515 |

OTHER PUBLICATIONS

Chemical Abstracts, American Chemical Society, Vol. 73, 1970, 121490a.

Primary Examiner—Leon D. Rosdol
Assistant Examiner—Irwin Gluck
Attorney—J. Gibson Semmes

[57] ABSTRACT

Sodium dithionite in solution is widely used in bleaching and vat dyeing of textiles. Unfortunately, however, losses occur not only through decomposition during dissolving of the salt in question, but also during storage of the solution. To avoid decomposition of such solutions, the presence of sulfite ion is introduced by sodium sulfite, or a comparable variant compound preferably with a pH adjustment under either aerobic or anaerobic conditions. The effect hereof in protecting the sodium dithionite against aerobic decomposition is at 7 percent to 45 percent of the decomposition rate for unprotected systems. With air exclusion, the rate in the protected system is at 2 percent to 71 percent that for the unprotected system. As indicated, mixtures of sodium sulfite or sodium bicarbonate with sodium bisulfite (anhydrous) have likewise been found effective as a stabilizing media for the sodium dithionite solution, all by virtue of the sulfite ion concentration increase therein.

11 Claims, No Drawings

SODIUM DITHIONITE SOLUTION STABILIZATION

CROSS REFERENCE TO RELATED APPLICATIONS

This application is related to U. S. Pat. No. 3,672,829, issued June 27, 1972; entitled SODIUM DITHIONITE STABILIZATION. This application is a continuation - in - part of our copending application ser. number 3,527, filed Jan. 16, 1970, entitled SODIUM DITHIONITE SOLUTION STABILIZATION now abandoned.

BACKGROUND OF THE INVENTION

Although the product sodium dithionite under normal storage conditions, moisture being excluded and free circulation of air avoided, can be held without appreciable decomposition for several years, upon dissolution of the product in water, decomposition takes place immediately. To avoid this degradation in solution and to prevent acceleration thereof to total decomposition is a problem that has plagued the industry for years. Known decomposition reactions of this valuable commercial bleaching compound are as follows, depending upon the acidic environment wherein the stronger the acidic condition the faster the rate of reaction.

ANAEROBIC REACTION

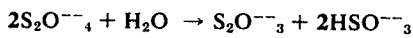

$2S_2O^{--}_4 + H_2O \rightarrow S_2O^{--}_3 + 2HSO^{--}_3$

AEROBIC REACTION

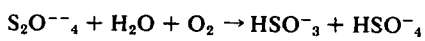

$S_2O^{--}_4 + H_2O + O_2 \rightarrow HSO^-_3 + HSO^-_4$

By the very nature of the decomposition reaction products, an acid condition is created through either the aerobic or anaerobic reaction aforesaid. Thus, either of the aforementioned reactions is likely to promote and accelerate further degradation of the sodium dithionite solution. Whereas, aerobic decomposition would not appear to be a serious factor in large storage systems — the depth of oxygen penetrating through the surface of the storage system is not great in comparison to the entire depth — auto-oxidation by anaerobic decomposition is inevitable regardless of solution depth or volume, per se.

In the past, the solution has been stabilized to a degree by treatment with caustic or ammonia. Cadmium sulfate as a stabilizer for sodium dithionite prepared in situ from sodium borohydride and sodium metabisulfite is another known form of stabilization. But the adverse effect in bleaching will be obvious from an examination of the reaction formula to yeild yellow cadmium sulfide, a distinct deterrent to brightness in a commercial bleaching operation, per se.

Known references in the literature include the following:

Chemical Week, July 27, 1968, pp. 54-55

M. Wayman, C.B. Anderson, W. J. Lem and W.H. Rapson, Tappi, 52 (1), 89-92 (1969)

Joyce U.S. Pat. No. 2,995,522

Hach U.S. Pat. No. 3,183,191

SUMMARY OF THE INVENTION

Under either an aerobic or anaerobic condition, low concentration sodium dithionite solutions treated with small but effective amounts of sodium sulfite or sodium bicarbonate with sodium bisulfite (anhydrous) tend to effect a sulfite ion concentration and with initial and sequential pH adjustment, the reaction effects a stabilization of sodium dithionite in aqueous solution. The conditions surrounding the intended stabilization reactions will be described hereinafter.

DESCRIPTION OF THE PREFERRED EMBODIMENTS

Aerobic Stabilization I

To achieve the stabilizing effect on a 5 percent aqueous solution of sodium dithionite for example, sodium sulfite or sodium bisulfite (anhydrous) was introduced under aerobic conditions at 31° Centigrade to 32° Centigrade. The results appear on Table I indicating that under this influence of the sulfite ion, the decomposition rate for such a stabilized aqueous solution is at 7 percent to 45 percent of that for an unprotected dithionite solution stored under comparable conditions. Reference compartive Run 718—65 (unprotected) and 718—97, the pH was adjusted to an initial value of 6.0. It will be observed that upon the introduction of less than half of one percent of the sodium sulfite to a 5 percent aqueous solution of sodium dithionite, the percentage of decomposition is drastically reduced over a comparable period of time.

With respect to the addition of a sodium bisulfite (anhydrous) (Run 718—125) under comparable conditions, a marked diminution in the percentage of composition for a comparable period of time is shown. But as the strength of the sodium bisulfite solution is increased, to compensate for a substantially stronger sodium dithionite aqueous solution (15 percent), a marked diminution in the percentage of decomposition is shown. (Run 718—133).

TABLE I

Aerobic decomposition of sodium dithionite in presence of sodium sulfite and sodium bisulfite (anhydrous)

| Run number | Percent | | | pH range | Temp., °C. | Time, min. | Percent | |
|---|---|---|---|---|---|---|---|---|
| | $Na_2S_2O_4$ | $Na_2SO_3$ | $NaHSO_3$ | | | | Decomp. | Decomp./min. |
| 718-65 | 5.0 | | | 6.0-3.8 | 32.0 | 13 | 78.3 | 6.03 |
| 718-07 | 5.0 | 0.5 | | 6.0-4.3 | 32.0 | 15 | 9.8 | 0.05 |
| 718-126 | 4.6 | 0.27 | | 7.1-6.1 | 32.0 | 20 | 8.2 | 0.41 |
| 718-125 | 4.6 | | 0.27 | 5.4-4.0 | 31.0 | 15 | 40.8 | 2.72 |
| 718-133 | 15.0 | | 0.90 | 6.0-5.7 | 31.0 | 20 | 1.6 | 0.08 |

Anaerobic Stabilization II

With respect to the anaerobic study in Table II, in Runs 717—63 and 717—79, the initial pH was set at 6.1 to 6.2. Here the dithionite system, stabilized by sodium sulfite (Run 717—79) decomposed at only 20 percent of the rate of the unprotected solution, (Run 717—63).

Without initial pH adjustment, in systems containing 5.8 percent to 10 % sodium sulfite based on the dithionite content, it was found that the decomposition rate of the protected system was 2 percent to 71 percent of that for the unprotected system. Reference Runs Nos.

717—284, 717—253 as compared to unprotected Run No. 717—245.

Although beneficial, the stabilizing effect of sodium bisulfite (anhydrous) was not nearly as great as for the sulfite ion, indicating a pH effect that to some extent negated the pure sodium sulfite effect, per se. Reference Runs 717—282; 717—292; 717—254. Here, the rate of decomposition is shown at 40 percent to 81 percent of that for the unstabilized solution, reference Run 717—63. Otherwise, the Table is self-explanatory.

anaerobic solution stability in the presence of mixtures of sodium bicarbonate and sodium bisulfite (anhydrous), similar results to those achieved through Table III were noted. This is the sodium bicarbonate — sodium bisulfite (anhydrous) system wherein increased concentrations of the additives, essentially an increase also in the sulfite ion concentration, yielded increased stability of the sodium dithionite, the pH ranges being generally established uniformly at 6. The most significant runs are Nos. 697—231 and 697—229.

TABLE II

Anaerobic decomposition of sodium dithionite in presence of sodium sulfite and sodium disulfite (anhydrous)

| Run number | Percent | | | pH range | Temp., °C. | Time, min. | Percent | |
|---|---|---|---|---|---|---|---|---|
| | $Na_2S_2O_4$ | $Na_2SO_3$ | $NaHSO_3$ | | | | Decomp. | Decomp./min. |
| 717-63 | 5.0 | | | 6.1-5.5 | 50.0 | 90 | 53.7 | 0.60 |
| 717-79 | 5.0 | 0.50 | | 6.2-5.7 | 50.0 | 90 | 10.1 | 0.11 |
| 717-245 | 5.0 | | | 6.5-5.4 | 50.0 | 90 | 46.8 | 0.52 |
| 717-284 | 4.8 | 0.28 | | 5.8-6.1 | 50.0 | 92 | 34.1 | 0.37 |
| 717-253 | 5.0 | 0.50 | | 7.2-7.0 | 50.0 | 90 | 3.8 | 0.04 |
| 717-282 | 4.6 | | 0.27 | 5.8-6.1 | 50.0 | 91 | 34.1 | 0.38 |
| 717-292 | 5.0 | | 0.50 | 4.8-4.7 | 50.0 | 81 | 34.2 | 0.42 |
| 717-254 | 5.0 | | 0.50 | 5.4-5.5 | 51.5 | 90 | 22.9 | 0.25 |
| 718-126 | 5.0 | 0.40 | | | 32.0 | ¹30 | 30.7 | ¹1.02 |
| 717-144 | 15.0 | 0.87 | | 7.2-5.9 | 51.0 | 90 | 33.4 | 0.37 |
| 701-113 | 15.0 | 0.87 | | | 10.0 | ¹71 | 40.0 | ¹0.56 |
| 701-113B | 15.0 | 0.87 | | | 10.0 | ¹71 | 84.3 | ¹1.19 |

¹ Hours.

Anaerobic Stabilization III

Table III is illustrative of a system of establishing anaerobic solution stability in the presence of a mixture of sodium sulfite and sodium bisulfite (anhydrous), the sodium dithionite being an approximate 5 percent solution. Here it is noteworthy that the decomposition rate of the sodium dithionite solution decreases from 0.55 percent per minute to 0.10 percent per minute, as the individual compositions are raised from 0.025 percent by weight in the solution to 0.20 percent.

The stability of the solution increased significantly although the pH remained essentially the same. Even in Run 718—187 where the ratio of bisulfite ion to sulfite ion was increased greatly and there was a definite lowering of the pH to a point very near the critical region for rapid decomposition, the decomposition rate was only 20 percent of that for the unprotected system.

Sulfite ion per se shall be deemed herein to include that which is derived from reaction of either sodium sulfite or sodium bisulfite (anhydrous) with the aqueous solution of sodium dithionite.

Test Procedure

The following steps outline the procedure employed in preparing the sodium dithionite solutions for decomposition studies under aerobic and anaerobic conditions.

1. A sealed plastic "glove bag" was loaded with necessary supplies and evacuated. The bag was then twice filled with nitrogen and re-evacuated. A final fill was made with high purity nitrogen (<20ppm $O_2$) to minimize decomposition by oxygen during solution preparation.
2. The desired amount of deaerated water was measured in a graduated cylinder and transferred to a 2-liter aspirator bottle. The sulfite additive to be evaluated was charged, with agitation, to a certain

TABLE III

Sodium dithionite—anaerobic solution stability in presence of various mixtures of sodium sulfite and sodium bisulfite (anhydrous)

| Run number | Percent | | | pH range | Temp., °C. | Time, min. | Percent | |
|---|---|---|---|---|---|---|---|---|
| | $Na_2S_2O_4$ | $Na_2SO_3$ | $NaHSO_3$ | | | | Decomp. | Decomp./min. |
| 718-148-1 | 5.0 | 0.025 | 0.025 | 5.9-5.4 | 50.5 | 85 | 46.5 | 0.55 |
| 718-148-2 | 5.0 | 0.05 | 0.05 | 6.5-5.9 | 50.5 | 76 | 34.9 | 0.46 |
| 718-148-3 | 5.0 | 0.10 | 0.10 | 6.4-6.0 | 51.0 | 84 | 22.9 | 0.27 |
| 718-148-4 | 5.0 | 0.20 | 0.20 | 6.2-6.3 | 51.0 | 92 | 9.2 | 0.10 |
| 718-187 | 4.7 | 0.14 | 0.40 | 5.7-5.8 | 50.0 | 88 | 8.7 | 0.10 |
| 718-245 | 5.0 | | | 6.5-5.4 | 50.0 | 90 | 46.8 | 0.52 |

Anaerobic Stabilization IV

With respect to Table IV in which there is illustrated

TABLE IV

Sodium dithionite—anaerobic solution stability in presence of various mixtures of sodium bicarbonate and sodium bisulfite (anhydrous)

| Run number | Percent | | | pH range | Temp., °C. | Time, min. | Percent | |
|---|---|---|---|---|---|---|---|---|
| | $Na_2S_2O_4$ | $Na_2SO_3$ | $NaHSO_3$ | | | | Decomp. | Decomp./min. |
| 718-245 | 5.0 | | | 6.5-5.4 | 50.0 | 90 | 46.8 | 0.52 |
| 718-137 | 5.0 | 0.016 | 0.076 | 6.1-5.5 | 50.5 | 90 | 46.2 | 0.51 |
| 697-227 | 5.0 | 0.033 | 0.156 | 5.7-5.4 | 50.0 | 81 | 32.5 | 0.40 |
| 718-138 | 5.0 | 0.048 | 0.228 | 5.7-5.4 | 50.5 | 81 | 34.2 | 0.42 |
| 697-232 | 5.0 | 0.050 | 0.235 | 6.4-6.2 | 49.9 | 80 | 21.7 | 0.27 |
| 697-231 | 5.0 | 0.066 | 0.312 | 5.7-5.5 | 49.8 | 81 | 1.4 | 0.02 |
| 717-295 | 5.0 | 0.066 | 0.312 | 5.4-4.9 | 50.2 | 80 | 12.7 | 0.16 |
| 718-140 | 5.0 | 0.066 | 0.312 | 6.0-6.1 | 51.0 | 84 | 21.1 | 0.25 |
| 697-229 | 5.0 | 0.132 | 0.624 | 6.0-6.2 | 50.0 | 81 | 7.0 | 0.09 | weight percentage of the total solution. Agitation was continued until solution of the additive was complete or for a maximum of 5 minutes. For tests in which the initial pH was adjusted to 6.0, 0.3 percent NaOH was dissolved in the water before addition of the additive. After transfer of the dithionite mixture to the test vessel, 2 percent $H_2SO_4$ was added for adjustment of pH to 6.0.

3. Sodium dithionite was then added with strong agitation to the additive-water solution. The time was measured from first contact of sodium dithionite with the aqueous mixture. Time in the aerobic studies was measured at the start of the air flow through the test mixture. Agitation was continued for a total of four minutes at which time sufficient mineral oil was added to cover the surface.

4. During time required to carry out steps 1-3, a 2-liter glass "resin reactor," fitted with an agitator, pH probes and sufficient inlets and outlets to allow sparging and addition of solution under anaerobic conditions, was placed in a constant temperature bath at 50°C and sparged with high purity nitrogen for a minimum of 10 minutes. Aerobic studies were made herein at 30°C; air flow was controlled by a rotameter which had been calibrated with a wet test meter; air addition was begun when the reaction mixture reached 30°C.

5. After sparging, the reaction mixture, exluding the layer of mineral oil, was charged to the test reactor. Periodic readings of pH and temperature were taken in conjunction with samples. The samples were titrated for dithionite content with rubine and titanous chloride.

In Step 2 of the foregoing Test Procedure, the addition of the sulfite additives was found to buffer the solution by an "alkaline reserve" process. Thus, when the sulfite stabilizers have been added to the solution, the pH factor was found to be additionally controlled by these stabilizers, preventing the solution from becoming too acidic with the undesirable result of dithionite decomposition. The adjustment of the pH to approximately 6.0 after the transfer of dithionite was further achieved by the addition of hydrogen sulfate, as described in the Test Procedure. Thus, the pH of the sodium dithionite solution was ultimately contained within the range of 4.0 to 7.2 over the test period using the bisulfite additives, as reported above.

We claim:

1. A method to stabilize aqueous solutions of sodium dithionite falling within the low concentration range of 4.6 percent to 15.0 percent during preparation and storage thereof comprising the steps of:
   A. initially establishing the pH factor in the said solution at from 5.0 to 8.0; and
   B. sequentially increasing by reaction the concentration of the sulfite ion in the sodium dithionite solution by adding at least one sulfite ion containing compound of not greater than 1.0 percent strength, whereby an alkaline reserve in the solution is created to effect continuous control of the pH within the range of from 5.0 to 8.0.

2. The method according to claim 1, wherein the concentration of the sulfite ion is effected by the addition of sodium sulfite in a small but effective amount not to exceed 1.0 percent strength.

3. The method according to claim 1, wherein the concentration of the sulfite ion is effected by the addition of anhydrous sodium bisulfite in a small but effective amount.

4. The method according to claim 1, wherein the concentration of the sulfite ion is effected by the addition of a mixture of sodium sulfite and anhydrous sodium bisulfite in a small but effective amount.

5. The method according to claim 1, wherein the concentration of the sulfite ion is effected by the addition of a mixture of sodium bicarbonate and anhydrous sodium bisulfite in a small but effective amount not to exceed 1.0 percent.

6. The method according to claim 1, wherein the increased concentration is effected by simultaneous admixture and agitation of a sulfite ion additive with the sodium dithionite, the proportion of additive to solution being a small but effective amount.

7. A reaction product for bleaching including a low concentration aqueous solution of sodium dithionite, falling within the range of 4.6 percent to 15 percent and a sulfite ion additive having a concentration not to exceed the extreme of 1.0 percent.

8. The product of claim 7 in which the additive comprises sodium sulfite.

9. The product of claim 7 in which the additive comprises anhydrous sodium bisulfite.

10. The product of claim 7 in which the additive comprises sodium sulfite and anhydrous sodium bisulfite in admixture.

11. The product of claim 7 in which the additive comprises sodium bicarbonate and anhydrous sodium bisulfite not to exceed in admixture 1.0 percent.

* * * * *